United States Patent

Barlow et al.

[11] 3,886,970
[45] June 3, 1975

[54] FLUID PRESSURE CONNECTOR AND BREAK-AWAY UNIT

[76] Inventors: Percy Barlow, 444 4th St., Weyburn, Saskatchewan; Roderick Bruce Barlow, 96 Rupert Dr., Saskatoon, Saskatchewan, both of Canada, S7K1B3

[22] Filed: Mar. 29, 1973

[21] Appl. No.: 345,953

[52] U.S. Cl......... 137/561 R; 137/614; 137/614.02; 137/614.03; 137/614.05; 251/149.9; 285/1; 285/84; 285/137 R
[51] Int. Cl...... F16l 37/12; F16l 37/22; F16l 37/28
[58] Field of Search . 137/351, 614, 614.02, 614.03, 137/614.05, 561 R; 251/149, 149.9; 285/137 R, 320, 1, 84, 119, 317

[56] References Cited
UNITED STATES PATENTS

| | | | |
|---|---|---|---|
| 2,538,259 | 1/1951 | Merriman | 137/351 |
| 2,660,456 | 11/1953 | Meddock | 137/351 |
| 2,837,749 | 6/1958 | Gross | 137/614.04 |
| 3,028,179 | 4/1962 | Abramoska | 285/320 |
| 3,301,272 | 1/1967 | Pettyjohn et al. | 137/614.06 |
| 3,710,823 | 1/1973 | Vik | 285/137 R |
| 3,730,221 | 5/1973 | Vik | 137/614.04 |

Primary Examiner—William R. Cline
Attorney, Agent, or Firm—Stanley G. Ade

[57] ABSTRACT

The main body of the connector is mounted for endwise movement on a mounting plate secured to the prime mover and is normally spring biased towards the prime mover, a pair of side ramp plates are pivotted to the sides of the main body and include recesses to receive bosses extending from the sides of the male connector portion which extends to the device or implement pulled or operated by the prime mover, and when the connecting portion is engaged within the main body portion. To engage the male portion, the main body is pushed along the plate against spring pressure and this causes the side plates to be ramped downwardly against lugs extending from the plates so that the male connector can be engaged. When the body portion is released, the spring returns it to the original position and the lugs ramped the side plates up into engagement around the bosses. If the device being pulled breaks away from the prime mover, the bosses pull the main body along the plate via the side plates thus causing the lugs to ramp the side plates downwardly which frees the male portion and enables it to be pulled clear from the main body portion.

8 Claims, 5 Drawing Figures

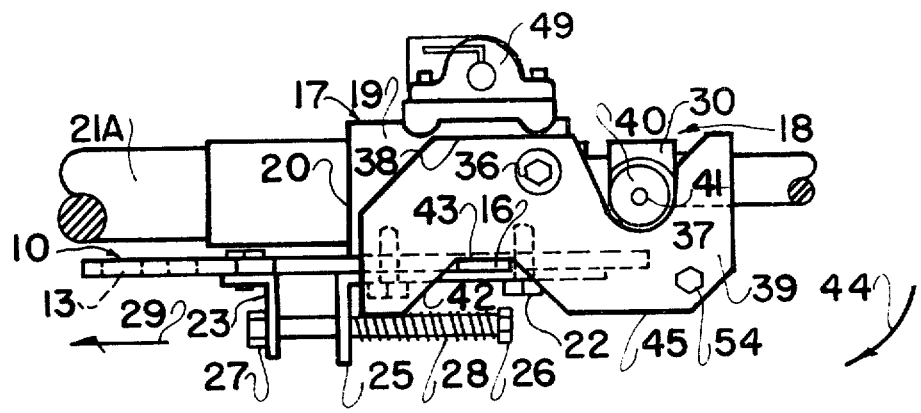
FIG. 1
FIG. 2
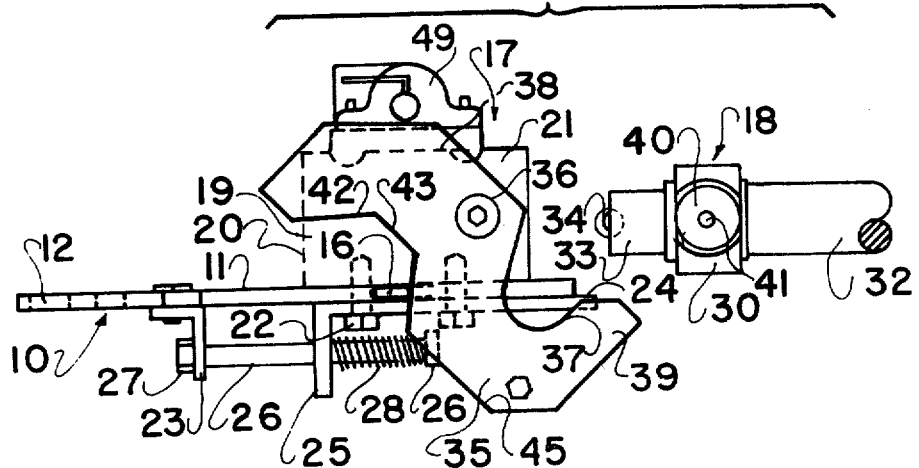

FLUID PRESSURE CONNECTOR AND BREAK-AWAY UNIT

BACKGROUND OF THE INVENTION

This invention relates to new and useful improvements in fluid pressure connecting devices and break-away units and constitutes an improvement over our U.S. Pat. Ser. No. 3,544,063.

It is conventional to provide a detachable connection within the hydraulic or pressure lines which extend between the pump and the fluid operators controlled by a valve connected to the pump. Although the device is designed specifically for use between a tractor and unit being pulled by the tractor, nevertheless such a connection can be used in other environments as desired.

When the tractor is operating an implement in the field, for example, and when said implement is controlled or includes fluid pressure operators, there is always the danger present that if the implement breaks away from the tractor, the fluid hoses will be broken or the coupling destroyed before the operator of the tractor is aware that the implement has broken away. This is an extremely expensive and time consuming repair and the present device not only provides a coupling which facilitates the connection, but enables same to break away without damage or loss of fluid occurring.

SUMMARY OF THE INVENTION

The principal object and essence of the invention is therefore to provide a male and female coupling for fluid pressure hoses, one portion of the coupling being secured to the prime mover and the other portion being secured to the device being operated by fluid pressure.

A still further object of the invention is to provide a device of the character herewithin described which includes means to facilitate the connection of the two portions together against the hydraulic pressure normally present within the fluid carrying lines.

A still further object of the invention in conjunction with the foregoing object, is to provide a device of the character herewithin described in which the two coupler portions are held securely together yet still provides unlocking means for rapid disengagement in the event that a break-away occurs.

Another object of the invention is to provide means between the two couplers to enable same to be held in the locked or assembled position yet enabling same to be disconnected readily and easily when desired.

Another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF FIGURES

FIG. 1 is a side elevation of the coupling assembly with the two portions connected together and locked.

FIG. 2 is a view similar to FIG. 1, but showing the two portions separated.

In the drawings like characters of reference indicate corresponding parts in the different figures.

DESCRIPTION OF THE DRAWINGS

Figure 3:
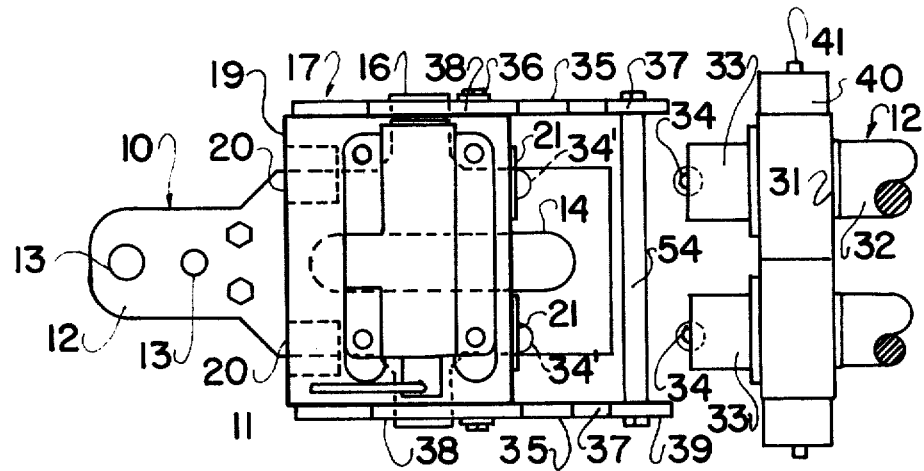
FIG. 3 is a top plan view of FIG. 2.

Proceeding therefore to describe the invention in detail, reference character 10 illustrates support means taking the form of elongated plate having a main part 11 and an attaching part 12 extending from one end thereof. This attaching part may be secured to a convenient location upon the prime mover such as a tractor, by means of bolt (not illustrated) extending through apertures 13 formed in the mounting part 12.

Figure 4:
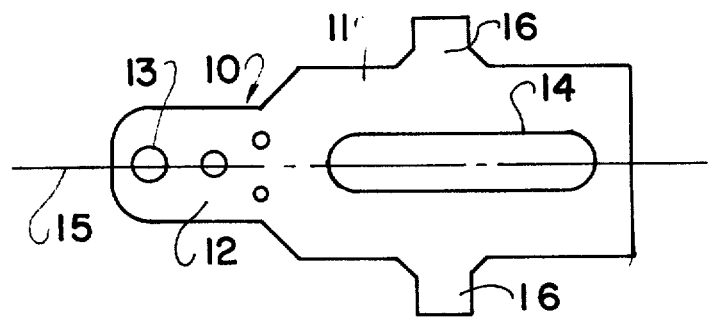
FIG. 4 is a top plan view of the support means or mounting plate per se.

The main portion is substantially rectangular when viewed in plan and shown in detail in FIG. 4. It includes an elongated slot 14 formed clear through the main portion 11 and extending substantially upon the longitudinal axis 15 thereof. A pair of projections 16 extend one upon each side of the main part 11, the purpose of which will hereinafter be described.

The connector includes a first connector portion collectively designated 17 and a second connector portion collectively designated 18.

In this embodiment, this first connector portion is the female part of the connecting assembly and includes a main body 19 having ports 20 at one end thereof to which may be connected hydraulic or other pressure hoses 21A extending to the prime mover as will hereinafter be described.

Situated upon the other side of the body 19 is a pair of spring loaded connector ports 21 and these are connected through the body 19, to the aforementioned ports 20. This is a conventional construction so that it is not believed necessary to show further details.

The main body portion or first connector portion 17 is mounted for limited endwise movement upon the plate or support means 10 by means of a pair of bolts 22 which extend through the slot 14 in the plate 10 and are threadably engaged within the underside of the main body 19 which rests upon the plate as clearly illustrated. This means that the heads of the bolts span the slot and prevent disengagement yet still permit endwise movement of the portion 17 within the limits of slot 14.

A lug 23 is secured to the plate 10 adjacent the connecting portion 12 and this lug extends vertically downwardly as shown in FIGS. 1 and 2.

Reference character 24 shows an elongated plate secured in sliding relationship to the underside of the plate 10 by means of the aforementioned bolts 22 so that in effect this plate 24 is integral with the main body 19 and moves therewith, with the main portion 11 of the mounting plate 10 being sandwiched therebetween.

This plate is provided with a downturned lug 25 at the rear end thereof substantially in spaced and parallel relationship with the lug 23 and an elongated bolt 26 is secured by one end to the lug 23 by means of nut 27 and extends freely through an aperture (not illustrated) within the portion 25 of the plate 24.

A compression spring 28 extends around the bolt 26 and reacts between the head 26′ and the plate or lug 25 thus normally biassing the portion 19 in the direction of arrow 29 or towards the prime mover (not illustrated).

The second connector portion 18, in this embodiment, comprises the male connector portion and consists of a substantially rectangular body 30 having ports 31 upon one side thereof to which may be secured fluid pressure hoses 32 which extend to the fluid operators (not illustrated) on the implement or attachment.

Spring loaded connector ports 33 are formed on the other side of the body 30 and connect with the hoses 32 in the usual way, reference character 34 showing the spring loaded balls normally acting as closure means when the second coupler 18 is not connected to the first coupler 17.

These couplers 33 are adapted to engage within the spring loaded ports 21 and when fully in engagement, the balls 34 and corresponding balls 34' are raised from the respective seats thus allowing fluid under pressure to be connected between the two connectors 17 and 18 in the usual way.

Means are provided to hold the second connector portion 18 into engagement with the first connnector portion 17, said means taking the form of a pair of plates 35 pivotted one upon each side of the main body 19 of the first connector portion, by means of pivot bolts 36 and each of these plates is provided with a substantially curved U-shaped recess 37 formed upon and depending from the upper edge 38 thereof and adjacent the end 39 of the plates.

Projection means are provided upon each side of the body 30 of the second coupler portion 18 and take the form of cylindrical bosses 40 journalled for rotation upon pins 41 extending from the sides of the body 30 and these bosses engage within the recesses 37 as clearly shown in FIG. 1.

The plates are maintained in this locked position by the provision of inclined ramp surfaces 42 formed upwardly from the lower edges 45 of the plates as clearly shown in FIGS. 1 and 2 and these inclined ramps 42 are engageable by the aforementioned projections 16 extending outwardly from the mounting plate 10 and when in the position shown in FIG. 1, these lugs engage the horizontal portions 43 of the inclined ramps 42 and the plates are held in this position by this engagement and due to the fact that the compression spring 28 is holding the first connector portions 17 to the leftward extremity of travel with respect to the drawings.

However, when it is desired to connect the second connector portion 18 to the first connector portion 17, these plates 35 have to be swung downwardly so that the portions 33 can engage within the ports 21 and in this connection, the main body or first coupler portion 17 is end shifted relative to the support plate 10 in a direction opposite to arrow 29, said end shifting being manual by grasping the first connector portion. This movement is, of course, against the pressure of spring 28 which compresses around shaft 26 and takes up the position shown in FIG. 2. As soon as the first connector portion 17 is end shifted to the right with reference to the drawings, the projections 16 engage the inclined ramp surfaces 42 and swing the plates downwardly in the direction of arrow 44 so that they swing free of the projections and can be moved downwardly to the position shown in FIG. 2 thus giving sufficient clearance to enter the second connector portion 18 into engagement with the first connection portion 17. As soon as first connector portion is released, spring 28 moves it to the left or in the direction of arrow 29 thus causing the plates to swing upwardly into engagement around the bosses 40 and take up the position shown in FIG. 1.

By the same token, if the implement or the like being pulled by prime mover, breaks away, the hoses 32 exert a pull upon the second connector portion 18 which, due to the engagement of the bosses 40 with the recesses 37, exert a pull on the first connector portion 17 and end shifts it in the direction opposite to arrow 29 and against pressure of spring 28. This causes the projections 16 to ramp the plates downwardly in the direction of arrow 44 thus enabling the second connector portion 18 to be disengaged from the first connector portion 17 without any damage occurring. By the same token, if manual disconnection is required, the first connector portion 17 is end shifted manually to the right or in a direction opposite to arrow 29.

When connecting the second connector portion 18 to the first connector portion 17, hydraulic fluid under high pressure is present at the ports 21 sealed by the balls 34' and it is sometimes extremely difficult to break this pressure in order to engage the second connector portion 18 fully with the first connector portion 17.

Figure 5:
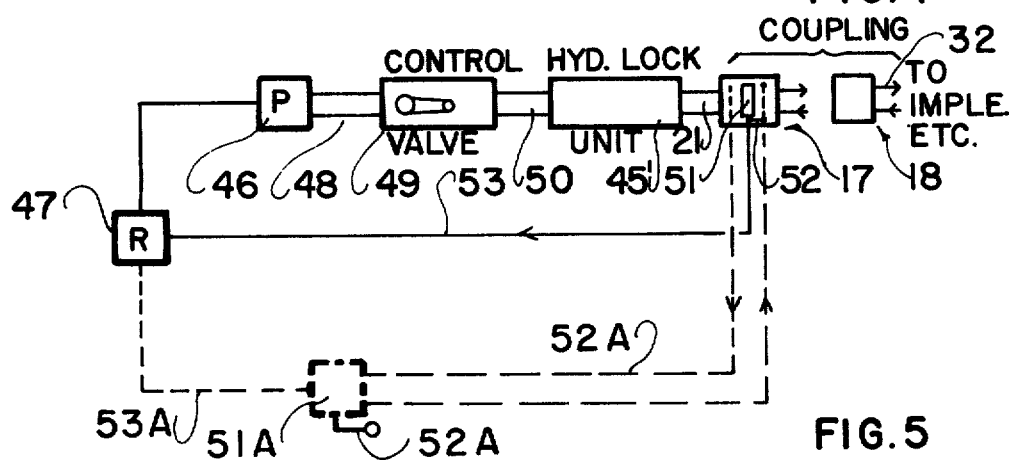
FIG. 5 is a schematic diagram of the hydraulic connection between the various portions.

This is because there is an hydraulic lock unit 45' shown schematically in FIG. 5 normally present in hydraulic ball pressure systems in order to prevent the cylinder creeping.

FIG. 5 shows a schematic in which a pump 46 is connected to a reservoir 47 and by means of hydraulic lines 48 to a main control valve 49. This in turn is connected to the hydraulic lock unit by means of hoses 50 and the hydraulic lock unit is connected to the first connector portion 17 by the aforementioned hoses 21.

The hydraulic lock unit has the effect of locking up the lines between the control valve and the coupler so that it is the pressure in lines 21 which has to be relieved before the coupling can occur.

A small valve 51 is provided, in one embodiment, upon the upper side of the first connector portion 17 and has an operating lever 52 connected thereto. Operation of this valve connects the two lines 21 to a return or release line 53 extending between valve 51 and the reservoir 47.

Alternatively, this valve 51 can be situated remotely from the coupler, as for example, adjacent the main control valve 49 whereupon hydraulic lines or hoses 52 connect between the first coupler portion 17 and the valve 51, it being understood that these connections are internal of the first coupler portion 17. For clarity, the second embodiment is shown in phantom and the corresponding reference characters are provided with the suffix "A".

In order to connect the two connector portions together valve 51 is operated to release the pressure within the lines back to the reservoir thus enabling the connection to be made readily and easily. Once the side plates have swung upwardly to the locked position, valve 52 is closed and the device operates in the usual manner.

Finally, note should be taken of cross bar 54 spanning the side plates 35 below recesses 37 to ensure that the side plates move or pivot together.

Since various modifications can be made in my invention as hereinabove described, and many apparently widely different embodiments of same made within the spirit and scope of the claims without departing from such spirit and scope, it is intended that all

What I claim as my invention is:

1. A fluid coupling assembly for connecting a source of fluid pressure to a fluid operator comprising in combination support means, a main body portion mounted on said support means for limited endwise movement relative thereto, said main body portion having fluid carrying hoses connectable to one side thereof, spring loaded connector ports upon the other side thereof, connected to siad fluid carrying hoses through said main body portion for carrying fluid from said hoses to said spring loaded connector ports, spring means reacting between said main body portion and said support means normally biasing said main body portion towards one end of said support means, a connector portion, spring loaded connector ports upon one side of said connector portion, fluid carrying hoses connectable to the other side of said connector portion, said ports being connected to said last mentioned hoses through said connector portion, and means to detachably connect said connector portion with said main body portion, whereby said connector ports of said main body portion engage with said connector ports of said connector portion and provide fluid connection between said main body portion and said connector portion, said means including further means pivotally connected to said main body portion and selectively engaging said connector portion, said first mentioned means including a pair of side plates pivoted one upon each side of said main body portion, said further means including a recess formed on said side plates and projections provided on said connector portion engageable with said recess, said projections including cylindrical bosses journalled for rotation one upon each side of said connector portion.

2. The assembly according to claim 1 which includes means co-operating between said support means and said side plates for disengaging said side plates from said connector portion when said main body portion is moved against the pressure of said spring means.

3. The assembly according to claim 2 in which said means co-operating between said support means and said side plates include projections extending from the sides of said support means, and ramp means formed on said side plates engaging said projections for pivotal action of said side plates when said main body portion moves longitudinally relative to said support means.

4. A fluid coupling assembly for detachably connecting a first coupler portion to a second coupler portion; said assembly including support means, said first coupler portion being mounted on said support means for limited endwise movement thereon, spring means reacting between said support means and said first coupler portion normally biasing said first coupler portion in a direction away from said second coupler portion, means on said first coupler portion for detachably locking said second coupler portion in engagement with said first coupler portion, said means including means for unlocking said second coupler portion from said first coupler portion when pull is exerted between said first coupler portions greater than the strength of said spring means, said means for detachably locking said second coupler portion into engagement with said first coupler portion including a pair of side plates pivotally mounted one upon each side of said first coupler portion, a projection extending upon each side of said second coupler portion and a recess in each of said side plates engageable by said projections when said second coupler portion is connected to said first coupler portion, and means co-operating between said support means and said side plates for pivoting said side plates out of engagement with said projections when said first coupler portion is moved in the opposite direction of said second coupler portion upon said support means against pressure of said spring means, each projection including a cylindrical boss journalled for rotation to said second coupler portion.

5. The assembly according to claim 4 which includes means to mount said first coupler portion upon said support means, said last means including an elongated slot formed through said support means and bolt means engaging through said slot and into said first coupler portion.

6. The assembly according to claim 4 in which said last mentioned means includes a ramp surface formed on each of said side plates and a ramp engaging projection extending from each side of said support means.

7. In a fluid coupling assembly for detachably connecting a first coupler portion to a second coupler portion and which includes a source of fluid pressure, a reservoir, an operating valve, and hydraulic lock means between said operating valve and said first coupler portion; the improvement consisting of support means, said first coupler portion being mounted upon said support means for limited endwise movement thereon, spring means reacting between said support means and said first coupler portion normally biasing said first coupler portion in a direction away from said second coupler portion, means on said first coupler portion for detachably locking said second coupler portion into engagement with said first coupler portion, said means including means for unlocking said second coupler portion from said first coupler portion when a pull is exerted between said portions greater than the strength of said spring means, and means for releasing fluid pressure within said first coupler portion to facilitate connection of said second coupler portion to said first coupler portion, said coupling assembly including a pair of fluid pressure lines connected to said first coupler portion, said last mentioned means including a valve assembly operatively connected between said fluid pressure lines and means to operate said valve means to connect said lines to said reservoir, and means to mount said first coupler portion upon said support means, said last mentioned means including an elongated slot formed through said support means and bolt means engaging through said slot and into said first coupler portion, said means for detachably locking said second coupler portion into engagement with said first coupler portion including a piar of side plates pivotally mounted one upon each side of said first coupler portion, a projection extending upon each side of said second coupler portion and a recess in each of said side plates engageable by said projections when said second coupler portion is connected to said first coupler portion, and means co-operating between said support means and said side plates for pivoting said side plates out of engagement with said projections when said first coupler portion is moved in the opposite direction of said second coupler portion upon said support means against pressure of said spring means, each projection including a cylindrical boss journalled for rotation to said second coupler portion.

8. The assembly according to claim 7 in which said last mentioned means including a ramp surface formed on each of said side plates and a ramp engaging projection extending from each side of said support means.

* * * * *